Sept. 8, 1925.
J. A. BROWN
PISTON RING
Filed March 13, 1924
1,552,910
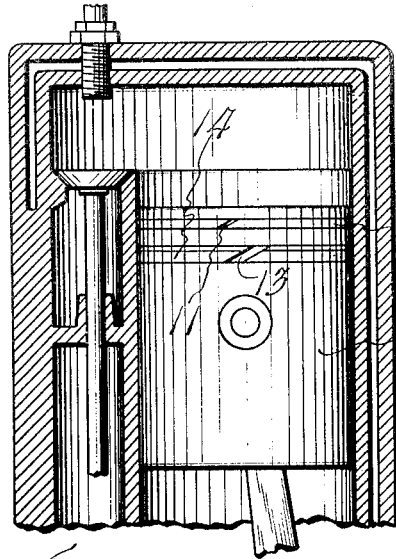
Fig.1.
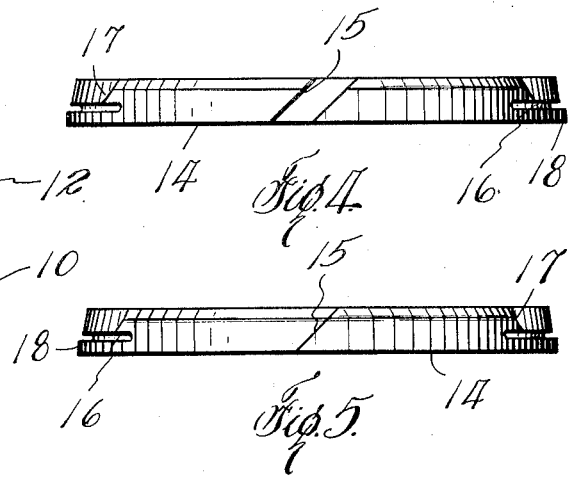
Fig.4.
Fig.5.
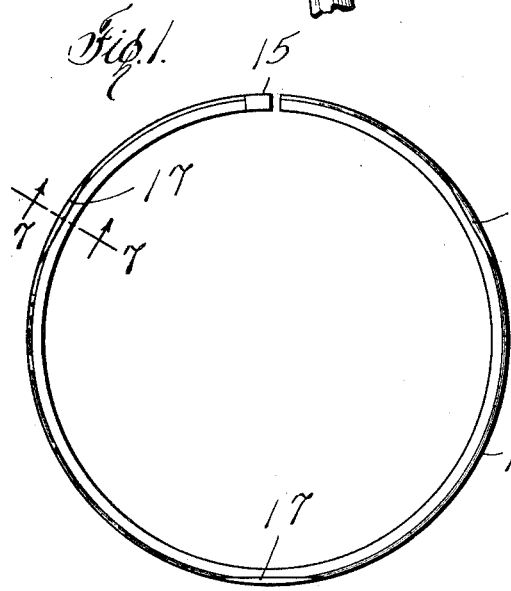
Fig.2.
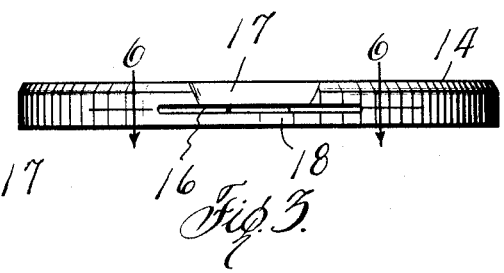
Fig.3.
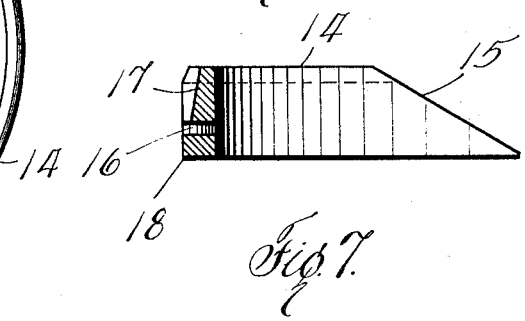
Fig.7.
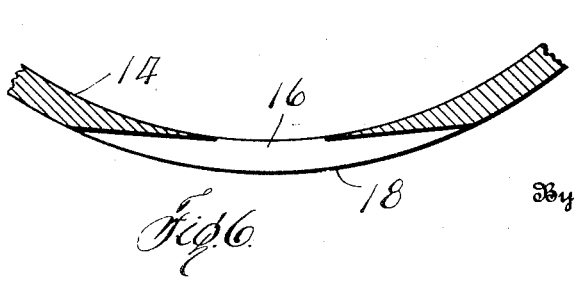
Fig.6.
Inventor
J. A. Brown
By Jack A. Ashley
Attorney Patented Sept. 8, 1925.

1,552,910

UNITED STATES PATENT OFFICE.

JOHN A. BROWN, OF DALLAS, TEXAS.

PISTON RING.

Application filed March 13, 1924. Serial No. 699,062.

*To all whom it may concern:*

Be it known that I, JOHN A. BROWN, a citizen of the United States of America, residing at Dallas, in the county of Dallas and State of Texas, have invented certain new and useful Improvements in Piston Rings, of which the following is a specification.

This invention relates to new and useful improvements in piston rings for internal combustion engines.

The invention contemplates means for preventing the pumping of oil above the piston in a cylinder by the use of a piston ring which normally has a relatively wide gap between its ends, and which is adapted to expand and close said gap when the engine is in operation and to contract and open said gap when said operation ceases, whereby any oil which has passed above said ring may drain back through said gap.

A further feature of the invention resides in reduced oil draining portions connected with drain ports extending through the ring for draining the oil from the above ring, particularly when the motor is not in operation.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a sectional view of a motor cylinder having a piston therein equipped with a ring constructed in accordance with my invention, Fig. 2 is a plan view of the ring, Fig. 3 is a side elevation of the same, Fig. 4 is a side elevation of the ring in its normal position, Fig. 5 is a side elevation of the ring in its expanded position, Fig. 6 is an enlarged sectional view on the line 6—6 of Fig. 4, and Fig. 7 is an enlarged sectional view on the line 7—7 of Fig. 2.

In the drawings the numeral 10 designates an ordinary piston such as is used in gasoline motors. This piston has the usual grooves 11 and piston rings 12, fitting therein, but this is subject to variation.

Below the usual rings I provide a ring groove 13 which is somewhat higher or wider than the other grooves. In this lower groove 13 is a piston ring 14 having a face considerably wider than the usual ring and having its ends 15 acutely bevelled to form a scarf joint. This ring has a normal or contracted diameter, such as to leave an enlarged gap between its ends 15 of the ring, as is shown in Fig. 4.

When the engine is started the upper rings will hold compression and as the motor warms up, the ring 14 will expand and gradually close the gap between its ends 15. This expansion will re-act in the elongation of the ring and will not freeze the ring in the cylinder, owing to the resilient nature of the ring and its play in the ring groove.

I prefer to bevel the upper edge of the ring, which is a common practice. At different points the ring is provided with narrow transverse ports or slots 16 in about the center of the face. Above the port the ring is cut away to form drain recesses or notches 17, which when the ring is in engagement with the wall of the cylinder, form ducts for draining the oil from above the ring. The portions 18 below the ports are continuous with the face of the ring and contact with the wall of the cylinder, thus giving the usual compression, as this portion of the ring is as wide as the ordinary ring now in use.

With the open gap between the ends 15 and the recesses and ports 16, an excess of oil accumulating above the ring will be drained below said ring through the groove 13. Experiments and tests of this ring in the cylinder of a motor which was pumping oil has demonstrated that it will drain the oil and prevent fouling of the spark plug and excessive carbon deposits.

In the tests which have been made a normal gap of three sixteenths of an inch was used. Ordinarily the gap between the ends of the usual ring is not over a sixteenth of an inch. This enlarged gap gives a free opening for the draining of the oil and this is aided by the ports.

I have obtained very good results by omitting the middle ring and using an ordinary piston ring in the upper groove and my improved ring in the lower groove. This acts to check the tendency of the oil to work upward on the cylinder wall and relieves the suction which would otherwise work below the top ring and which suction tends to pump the oil. The looseness and the gap of my improved ring counteracts the foregoing and holds the oil below the top ring.

Various changes in the size and shape of the different parts, as well as modification and alterations may be made within the scope of the appended claim.

What I claim, is:

A split piston ring having an amplified face provided with central radial drain ports and drain recesses above the ports extending downward from the upper face of the ring and the portion of its amplified face lying below said ports being continuous and contiguous to its contour, except its split ends which are spaced to provide an abnormally wide gap between said ends.

In testimony whereof I affix my signature.

JOHN A. BROWN.